Feb. 28, 1933.  C. A. WARBURTON  1,899,373
HERNIA TRUSS
Filed Oct. 10, 1931   2 Sheets-Sheet 1

Inventor
C. A. Warburton
By Clarence A. O'Brien
Attorney

Feb. 28, 1933.   C. A. WARBURTON   1,899,373
HERNIA TRUSS
Filed Oct. 10, 1931   2 Sheets-Sheet 2
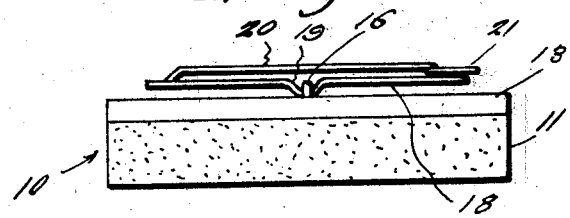
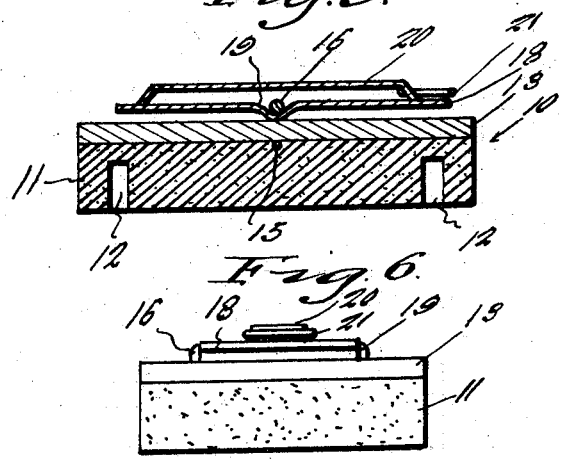
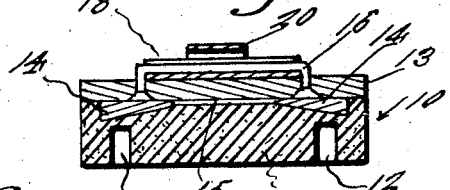
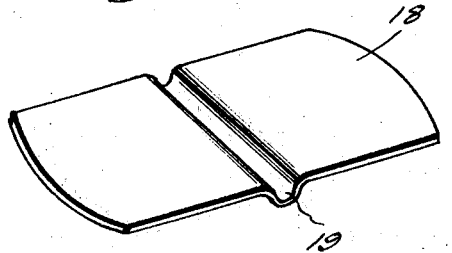
Inventor
C. A. Warburton
By Clarence A. O'Brien
Attorney Patented Feb. 28, 1933

1,899,373

UNITED STATES PATENT OFFICE

CHARLES A. WARBURTON, OF EXETER, NEW HAMPSHIRE

HERNIA TRUSS

Application filed October 10, 1931. Serial No. 568,141.

This invention relates to an improved surgical appliance such as is sometimes referred to in the art and trade as a hernia truss, and otherwise known as a rupture supporting bandage.

The special selection and co-ordination of parts is destined to provide a structure recognizable as a novel contribution to the prior art, and calculated to fulfill the requirements of an appliance of this class in a manner more satisfactory than prior patented and marketed trusses utilized for the same general purpose.

Structurally speaking, the improved appliance is characterized by three paramount features; namely an improved pad, an improved method of associating the belt with the pad, and distinguishable device for connecting the belt and pad together to promote freedom of bodily movement without allowing displacement of the pad or belt.

In the drawings:

Figure 4 is an edge elevation of the structure seen in Figure 3.

Figure 5 is a longitudinal section on the line 5—5 of Figure 3.

Figure 6 is an end elevation of Figures 3 and 4.

Figure 7 is a central transverse section on the line 7—7 of Figure 3.

Figure 8 is a perspective view of the belt backing plate.

Figure 1:
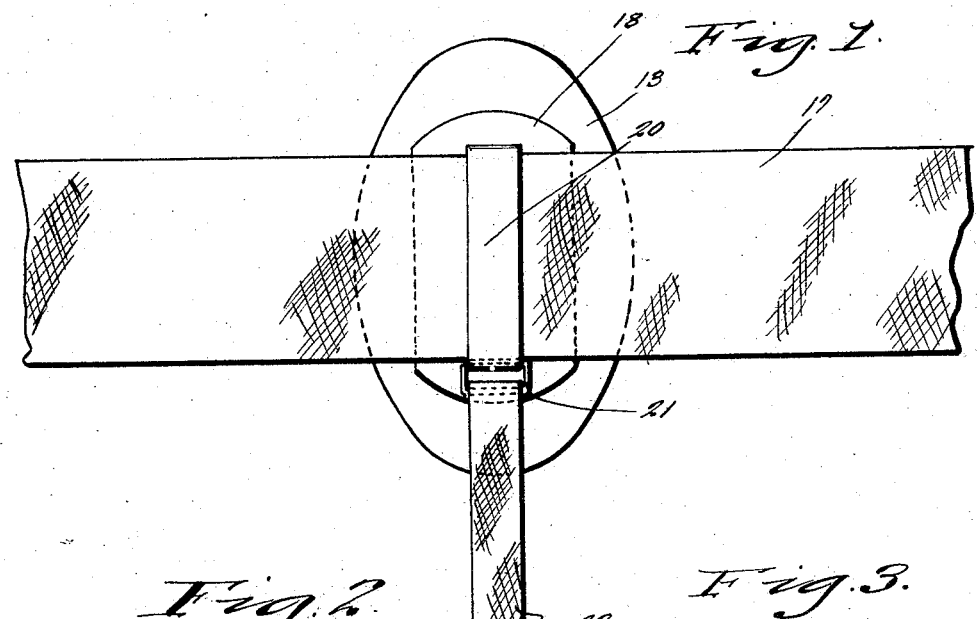
Figure 1 is an outside elevational view showing the association of the belt and pad.
Figure 2:
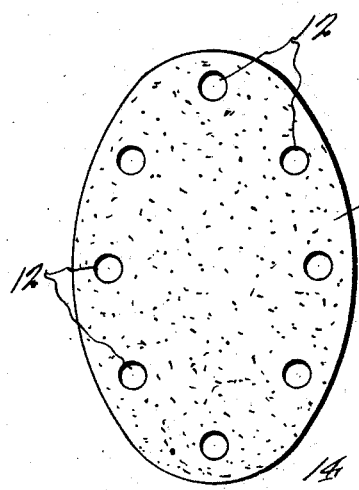
Figure 2 is an inner elevational view of the body contacting lamination of the pad.
Figure 3:
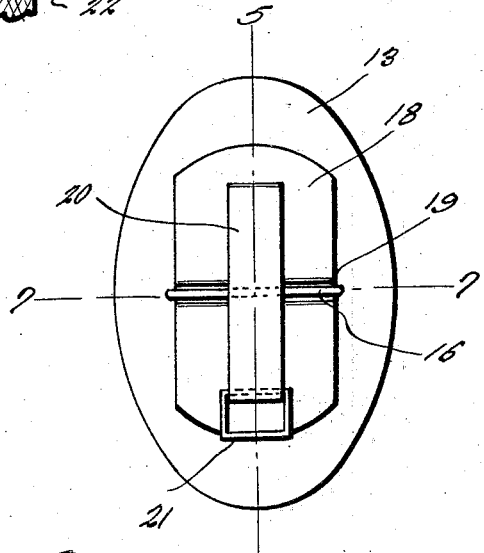
Figure 3 is an external elevational view of the pad disclosing the belt attaching means.
Figure 9:
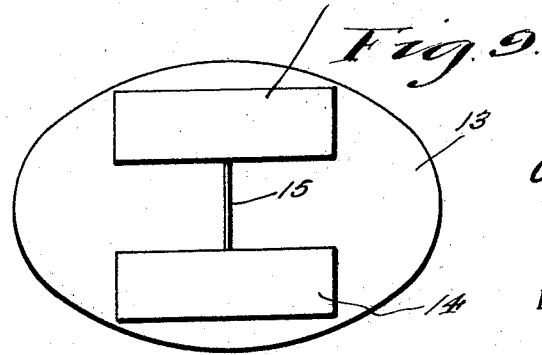
Figure 9 is a plan view of the insert mounted in the outer layer or lamination of the pad.

In the drawings, the pad, as a unit, is distinguished by the numeral 10. As before implied, it is of laminated construction and preferably made up of an oval block of rubber 11 having a multiplicity of marginal sockets 12 intended to provide the desired suction properties to guard against undue slippage and to thereby provide for effective maintenance of this part of the pad against the rupture.

Cemented or otherwise rigidly secured to the outer face of the rubber ply or block 11 is a single ply of leather 13 or other suitable material of appropriate strength designed to provide the desired rigidity.

Interposed between the plies 11 and 13 are spaced parallel cleats 14 of leather or suitable rigid material these cleats being wedge-shaped in cross section and secured together in spaced parallelism by a tie 15. The cross sectional shape of these spaced parallel cleats 14 is designed to slightly cup the rubber ply 11 to provide the desired concaved configuration to further facilitate proper maintenance of the pad.

Rigidly attached to the pad is a U-shaped staple 16 having its headed end portion imbedded in the leather ply 13 and bearing against the insert or cleat 14 to properly distribute the strain and stress and to produce the desired degree of pressure maintained against the pad when the belt is sufficiently tightened.

The belt which may be of any appropriate construction is distinguished by the numeral 17 and the means for connecting the belt to the pad by way of the staple 16 is an important feature of the invention. This means comprises a substantial rectangular metal plate 18 having its intermediate portion bent as at 19 to provide a channel. This channel is rockably connected with the bight portion of the staple 16.

The plate 18 carries a loop 20 for passage of the belt and a link 21 to accommodate a crotch strap 22.

The plate 18 constitutes a backing member for the belt and constitutes a rockable coupling between the belt and pad allowing the desired fulcrum connection between the belt, plate, and pad whereby to permit the pad to rock back and forth in a longitudinal manner, but to avoid lateral or sidewise motion. This is designed to accommodate freedom of movement of the body of the wearer when stooping, etc.

I wish to repeat that one of the paramount features of the invention is the specific laminated pad with its absorbent self-conforming properties characterized by the suction socket 12 and laminated formation of rubber and leather, together with the insert 14 tied together in spaced parallelism and intended to slightly cup the rubber facing or block 11 when the pad is properly worn.

In addition the specific fulcrum and attaching plate with the belt loop, as well as the rocking connection provided between the belt and pad constitutes a cardinal feature of importance. Likewise, the structure as a whole is characterized by simplicity and economy, and transcends as an improvement in the art in that it promotes greater comfort and curative properties than previously known trusses.

It is thought from the foregoing description that the advantages and novel features of the invention will be readily apparent.

It is to be understood that changes may be made in the construction and in the combination and arrangement of the several parts, provided that such changes fall within the scope of the appended claim.

I claim:

A truss embodying a pad comprising a laminated ovate body, said body including an inner ply of rubber, a reinforcing ply of leather secured to the outer face of said inner ply, and a pair of spaced parallel substantially rigid inserts interposed between said inner and outer plies, said inserts being tied together and being of wedge-shaped cross sectional shape for the purpose specified, a U-shaped staple having headed end portions anchored in said outer leather ply and bearing against said wedge-shaped inserts, and a plate having a U-shaped bend at its center and forming a depression on the outer face of the plate through which the bight of the staple passes, with the convex portion of the bend resting against the outer ply and a belt receiving member having its ends connected to the outer face of the plate.

In testimony whereof I affix my signature.

CHARLES A. WARBURTON.